Feb. 5, 1952     C. F. PEARSON     2,584,610
REMOVABLE HEAD AXLE
Filed March 18, 1946
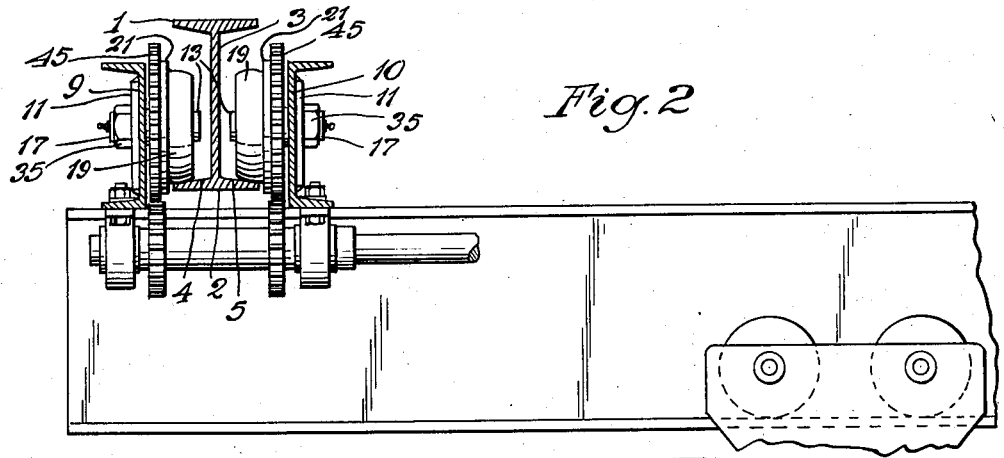
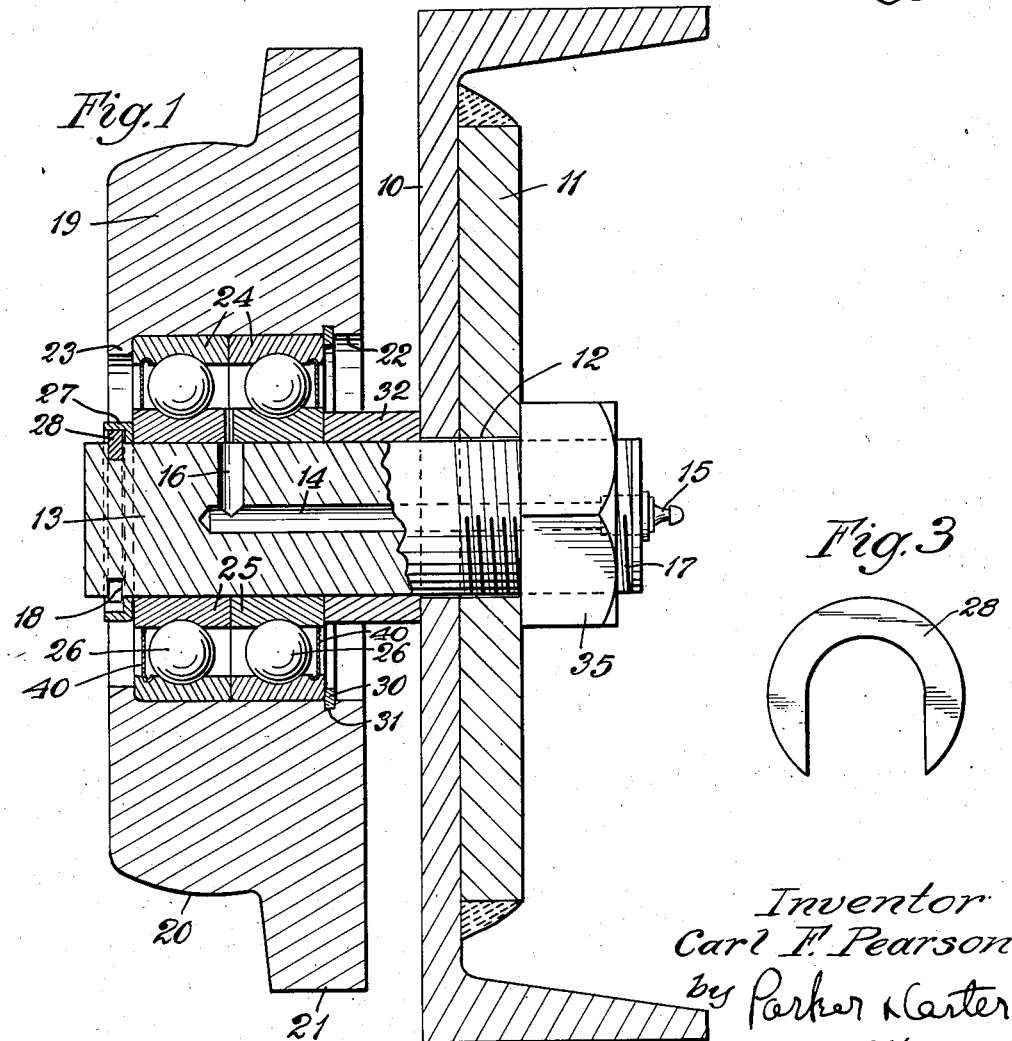
Inventor
Carl F. Pearson
by Parker & Carter
Attorneys Patented Feb. 5, 1952

2,584,610

UNITED STATES PATENT OFFICE 2,584,610

REMOVABLE HEAD AXLE

Carl F. Pearson, Chicago, Ill., assignor to Industrial Equipment Co., Chicago, Ill., a corporation of Illinois Application March 18, 1946, Serial No. 655,313

1 Claim. (Cl. 105—154)

My invention relates to an improvement in removable head axles. One purpose is to provide a removable head axle adapted for use with cranes, trolleys, conveyors and other equipment.

Another purpose is to provide an efficient wheel or roller and axle unit which may be readily removed, endwise, through access primarily at one end of the axle, and where the axle is employed with a limited clearance between the inner end of the axle and an adjacent member.

Another purpose is to provide an improved removable axle unit in which the axle may be readily and quickly withdrawn endwise through a suitable support.

Another purpose is to provide a supporting assembly for cranes and the like in which an improved axle and wheel mounting is provided, which permits individual axles and wheels to be removed without disassembling the crane truck as a whole.

Another purpose is to provide an improved crane truck and axle assembly therefor which includes securing means which permit ready endwise removal of the axles.

Other purposes will appear from time to time in the course of the specification and claim.

I illustrate the invention more or less diagrammatically in the accompanying drawings, wherein:

Figure 1 is a vertical section illustrating the wheel and axle assembly;

Figure 2 is a similar section, on a smaller scale, illustrating a plurality of my assembly units applied to an underhung crane structure; and Figure 3 is a view of a washer employed.

Like parts are indicated by like symbols throughout the specification and drawings.

Referring to the drawings, 1 generally indicates a track in the form of an I-beam having lower cross flanges 2 and a central web 3. It will be understood that the lower cross flange 2 serves as a double track, adapted to receive a wheel or roller at each edge. It will be noted also that the upper surface of the cross flange 2 is outwardly inclined at each side as at 4, 5.

Referring to the unit proper, I illustrate an end truck frame including the channels 9 and 10, which may be suitably connected together by means not indicated in detail. It will be understood that the channels 9 and 10, or equivalent members, are preferably so secured together as to form a strong structure which acts as a structural unit. In Figure 2 they are shown as connected by the crane beams which they support, but other connecting means may be used. Since the structures in each channel may be identical, I will consider them in connection with Figure 1 which shows a single unit in relatively large scale. The channel 10 is arranged to have its main web generally vertically disposed. A reinforcing plate or block 11 may be employed, welded or otherwise suitably secured to the outer face of the web. The members 10 and 11 are apertured in alignment as at 12. The axle member is generally indicated at 13. It is provided with an axial oil duct 14 externally provided with any suitable pressure fitting or closure 15, whereby oil, grease or any other suitable lubricant may be delivered through the channel 14 and the radial duct 16 to the below described bearing devices. The axle 13 is screw threaded at its outer end as at 17. At its inner end it is circumferentially channeled as at 18. 19 is any suitable roller or wheel having a rounded or tapered track engaging surface 20 and a circumferential flange 21. The wheel is axially apertured as at 22, the inner end of the aperture terminating in a reduced portion or abutment 23. In assembling the unit one or more roller or ball bearings may be inserted in the aperture 22. I illustrate two sets of ball bearings including outer races 24, inner races 25 and balls 26. The outer races 24 abut against the ledge 23. The inner races 25 abut against a cup retainer 27, which is slipped over the inner end of the axle 13 and is held in place by the horseshoe washer 28 which enters the circumferential groove 18. The cup retainer, in turn, prevents unintended removal or escape of the washer 28 when the parts are in the position in which they are shown in Figure 1. The outer races 24 may be located in position against the abutment or ledge 23, for example, by a suitable split ring or lock 30 which may be sprung into any suitable circumferential groove 31 in the face of the aperture 22 of the wheel 20. The inner races 25 may be opposed by a spacer or abutment sleeve 32, shown as surrounding the axle 13 and abutting at its outer end against the inner face of the channel 10.

It will be understood that after the assembly of the axle 13, the wheel 19 and the associated parts has been completed, the nut 35 may be employed to draw the parts into the position in which they are shown in Figure 1, with the sleeve 32 abutting against the inner face of the channel web. The parts are then firmly held in position, with the cup retainer 27 circumferentially surrounding the horseshoe washer 28 and holding it against escape from locking position. The parts may be lubricated through the fitting 15, the duct 16 delivering the lubricant to the bearings, assuming that the unit is employed as shown in Figure 2, in an arrangement where access to the inner end of the axle is difficult and the space limited. If removal of the axle is necessary, the user can release the nut 35 and then thrust the axle 13 endwise inwardly toward the web 3 of the track. There is sufficient space for the insertion of a hand or tool, for moving the cup retainer 27 out of circumferential alignment with the washer 28. The washer 28 can then be removed from the groove 18. In practice, with the structure as shown, the washer 28, when the parts are initially assembled, may be inserted downwardly into the slot or groove 18, with its ends down. This is the position in which it is shown in Figure 1, in an assembled unit. When the shaft 13 is moved to the left, referring to the position of the parts in Figure 1, and as soon as the washer 28 is clear of the retainer 27, it will tend to rotate gravitationally until the closed part of the washer is at the bottom. The washer then simply drops off of the end of the axle 13, and the axle 13 may be withdrawn readily to the right, referring to the position of the parts as shown in Figure 1, without the necessity of even inserting a tool within the truck. When the axle is being initially inserted, or re-inserted, the necessary washer 28 can be positioned in the groove 18 by any suitable tool, or by the hand, and the parts are then quickly tightened, with the washer 28 in the position in which it is shown in Figure 1. Once the washer has been removed, the axle 13 may be removed endwise through the aperture 12. The assembly may be originally made, or replaced in its original condition, by similarly reinserting the axle 13 through the wheel far enough to permit the application of the horseshoe washer 28. When the parts are again tightened up, by the nut 35, to the position shown in Figure 1, the washer is again locked by the cup retainer.

Any suitable seals 40 for the bearings may be employed. If a driving connection for or between the wheels 19 is desired, any suitable gears 45 may be employed, suitably secured in relation to the wheels 19.

It will be realized that, whereas, I have described and illustrated a practical and operative device, nevertheless many changes may be made in the size, shape, number and disposition of parts without departing from the spirit of my invention. I therefore wish my description and drawings to be taken as in a broad sense illustrative or diagrammatic, rather than as limiting me to my precise showing.

The use and operation of my invention are as follows:

With reference to the structure as shown in Figure 2, it is clear that only a restricted space is permitted between the vertical web 3 and the inner end of the shaft 13. However, with my invention, I find it easy and practical to release the wheel or roller 19, and to remove, if necessary, the axle 13, without a general dismantling of the device. When the parts are in the normal running position in which they are shown in Figure 1, the nut 35 draws or urges the axle 13 to the right, referring to the position in which the parts are shown in Figure 1. The washer 28 is surrounded by the cup flange 27, and urges against the inner cup end, thrusting the cup against the inner ball races, thrusting the ball races against the spacer 32, and thrusting the spacer 32 against the support 10. It will be understood that the screw threaded end of the shaft 13 may be milled off or flattened, to permit the simultaneous application of holding and turning tools to the axle 13 and the nut 35. If the nut 35 is partly released, the axle 13 may then be pushed to the left. The operator can then insert his hand or a tool into the space between the wheel 19 and the web 3, and push the cup 27 inwardly out of alignment with the horseshoe washer 28. It is then removed, and the axle 13 can be removed to the right, still referring to the position of the parts in Figure 1. This frees the wheel 19 which can be then rolled along the flange 5 and removed. The wheel is replaced by reversing the above described process.

Whereas I find a horseshoe washer and cup a convenient locking arrangement, I can use any suitable substitute therefore. Whereas I illustrate an outwardly inclined upper flange surface 4 or 5, it will be understood that my invention works practically with a horizontal surface flange.

While my invention has other applications, it is particularly advantageous for use in crane trucks which ride along tracks having the general form of the I-beam shown in Figure 2. In such trucks the side members 9 and 10 are preferably secured permanently together. In any event, they are connected to provide a structure of considerable rigidity which need not be taken down and reassembled every time a bearing has to be checked or a wheel replaced. In practice, such trucks operate along I-beams or tracks in which a minimum clearance is provided between the ends of the axles 13 and the opposed surfaces of the web 3 of the track. I therefore find it important to employ securing means at the ends of the axles 13, which have no extension beyond the end of the axles, which are movable with the axle when the axle is initially moved inwardly through the wheel to release the locking means, and which drop off gravitationally when released.

It is further important that it should be necessary, in order to release the wheel, merely to release the locking member or nut 35, to permit the axle to be pushed slightly through the wheel. The clearance between the web 3 of the track and the ends of the axles is sufficient to permit enough endwise movement of the axles to clear the slot or channel 18 from the wheel. If the wheel 19 and the cup 27 move inwardly with the axle, from the web, the hand, or a simple bar or lever, can be used to push the wheel 19 back toward the web, and to push the cup 27 back against the inner race 25. The washer 28 then usually drops by gravity out of the channel 18, or can easily be removed. There is nothing to prevent ready movement of the axle 13 in relation to the wheel 19 when the nut 35 is released, and no connection between the wheel or outer race and the locking means.

I claim:

In a flanged wheel and truck assembly for cranes and the like, a truck supporting member having a generally flat vertical body apertured intermediate its upper and lower edges, a stub shaft extending through said aperture, a flanged wheel mounted for rotation about said shaft at one side of the truck supporting body, said wheel being of a diameter not greater than the height of the truck supporting member, locking means for the opposite end of said shaft at the opposite side of the truck supporting member, including means formed and adapted to exert force on the shaft tending to withdraw it through the wheel, anti-frictional bearing means between the wheel and the shaft including a bearing race surrounding the shaft, spacing means extending between the bearing race and the adjacent face of the truck supporting member, and means for limiting the withdrawal of the shaft through the wheel and for holding the wheel in predetermined position in relation to the truck supporting member, including a cup-shaped ring having an inwardly extending flange abutting the bearing race, the end of the shaft being circumferentially channeled, and a U-shaped washer in said channel, said washer and channel being surrounded by said ring when the locking means is in locking position at the opposite end of the shaft, the U-shaped washer being thereby held in locking position except when the locking means is released and the shaft is moved in an opposite direction through the wheel, the U-shaped washer loosely penetrating the channel in the shaft and being free to drop gravitationally out of contact with the shaft when the cup-shaped ring and the circumferential channel are out of alignment with each other.

CARL F. PEARSON.

REFERENCES CITED

The following references are of record in the file of this patent:

UNITED STATES PATENTS

| Number | Name | Date |
|---|---|---|
| 1,652,009 | Hoffmaster | Dec. 6, 1927 |
| 1,795,992 | Blume | Mar. 10, 1931 |
| 1,916,233 | Riblet | July 4, 1933 |
| 2,161,210 | Waalkes | June 6, 1939 |
| 2,316,667 | Breslav | Apr. 13, 1943 |